(12) United States Patent
Kilcher et al.

(10) Patent No.: US 10,401,640 B2
(45) Date of Patent: Sep. 3, 2019

(54) MICRO-PROJECTION DEVICE WITH ANTI-SPECKLE VIBRATION MODE

(71) Applicant: North Inc., Kitchener (CA)

(72) Inventors: Lucio Kilcher, Montreux (CH); Nicolas Abele, Demoret (CH); Faouzi Khechana, Preverenges (CH)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 14/833,959

(22) Filed: Aug. 24, 2015

(65) Prior Publication Data

US 2016/0054577 A1 Feb. 25, 2016

Related U.S. Application Data

(63) Continuation of application No. 13/638,264, filed as application No. PCT/EP2010/055761 on Apr. 28, 2010, now Pat. No. 9,128,363.

(51) Int. Cl.

| | |
|---|---|
| *G02B 26/08* | (2006.01) |
| *G02B 26/10* | (2006.01) |
| *G02B 26/12* | (2006.01) |
| *G02B 27/48* | (2006.01) |
| *G03B 21/20* | (2006.01) |
| *H04N 9/31* | (2006.01) |

(52) U.S. Cl.
CPC ......... *G02B 27/48* (2013.01); *G02B 26/0833* (2013.01); *G02B 26/105* (2013.01); *G03B 21/2033* (2013.01); *H04N 9/3129* (2013.01)

(58) Field of Classification Search
USPC ......... 359/213.1, 214.1, 216.1, 217.3, 221.2, 359/221.3, 226.1, 226.2
See application file for complete search history.

(56) References Cited

U.S. PATENT DOCUMENTS

| | | | |
|---|---|---|---|
| 7,405,869 B1* | 7/2008 | Morris | H03D 7/00 342/100 |
| 2004/0223126 A1* | 11/2004 | Hatakeyama | G02B 17/0848 353/122 |
| 2006/0226226 A1* | 10/2006 | Asai | G02B 26/101 235/454 |
| 2009/0212203 A1* | 8/2009 | Gibson | G02B 26/085 250/234 |
| 2009/0244669 A1* | 10/2009 | Uchikawa | G02B 26/101 359/202.1 |
| 2011/0102748 A1* | 5/2011 | Shevlin | G02B 26/0833 353/38 |

* cited by examiner

*Primary Examiner* — Brandi N Thomas
(74) *Attorney, Agent, or Firm* — Thomas Mahon

(57) ABSTRACT

A micro-projection system for projecting light on a projection surface, comprising: at least one coherent light source (101); optical elements (102, 108, 109) in the optical path between said coherent light source and said projection surface; said optical elements including at least one reflective member (102) actuated by a drive signal for deviating light from said light source so as to scan a projected image onto said projecting surface; said optical elements including at least one vibrating element (102) actuated by a vibrating signal so as to reduce speckle onto said projecting surface. The corresponding method for reducing speckle is also provided.

17 Claims, 5 Drawing Sheets

MICRO-PROJECTION DEVICE WITH ANTI-SPECKLE VIBRATION MODE

CROSS-REFERENCE TO RELATED APPLICATIONS

This application is a continuation of, claims the benefit of and priority to, previously filed U.S. patent application Ser. No. 13/638,264 entitled "MICRO-PROJECTION DEVICE WITH ANTISPECKLE VIBRATION MODE" filed on Nov. 28, 2012, which is a national phase application of PCT/EP2010/055761 filed Apr. 28, 2010, the subject matter of both of the above are hereby incorporated by reference in their entirety.

FIELD OF THE INVENTION

The present invention relates to a micro-projection system comprising at least one coherent light source, such as laser, and optical elements in the optical path between the coherent light source and the projection surface. It also relates to a method for reducing speckle in such micro-projection systems.

BACKGROUND

Speckle is a phenomenon created with laser light sources, due to the fact that laser light is coherent. Parallels and synchronized wavefronts simultaneously hit the projection surface. When the light hits the surface, it creates constructive and destructive interference. The first category of interference induces an image deterioration that is often visible by human eye and/or by sensors. In addition to a loss of image quality, visual comfort of the viewer may also be affected.

Several techniques are used in order to remove or reduce speckle. In many cases, light coherence reduction techniques are used. For instance, the light hitting the projection surface is provided from various projection angles. Polarized laser light hitting a depolarized film is also used. Otherwise, illumination using various laser wavelengths may also be used.

Another approach consists in using vibration of the projection surface. The resulting systems are complex, expensive, and involve very specific hardware material.

WO2009/077198 describes an optical system comprising a coherent light source and optical elements for directing light from the source to a target. The optical elements include at least one diffusing element arranged to reduce a coherence volume of light from the source and a variable optical property element. A control system controls the variable optical property element such that different speckle patterns are formed over time at the target with a temporal frequency greater than a temporal resolution of an illumination sensor or an eye of an observer so that speckle contrast ratio in the observed illumination is reduced. The variable optical property element may be a deformable mirror with a vibrating thin plate or film. This solution requires modifying the projection system in order to integrate additional components, such as diffusing elements.

WO2007/112259 describes a system and method for reducing or eliminating speckle when using a coherent light source. A refracting device, comprising a birefringent material, is positioned such that the refracting device intercepts the coherent light. The refracting device rotates, thereby causing the ordinary and/or extraordinary beams to move. The human eye integrates the movement of the beams, reducing or eliminating laser speckle. The refracting device may include one or more optical devices formed of a birefringent material. Wave plates, such as a one-half wave plate, may be inserted between optical devices to cause specific patterns to be generated. Multiple optical devices having a different orientation of the horizontal component of the optical axis may also be used to generate other patterns. Furthermore, the refracting device may include an optical device having multiple sections of differing horizontal components of the optical axis. This solution involves a complex and expensive component, the rotating refracting device. Moreover, the integration of such device requires a specific global design.

US2009/0161196 describes a system and method for temporally varying the interference pattern generated by a coherent light source to homogenize the speckle pattern so that the speckle phenomenon is less observable. In accordance with an exemplary embodiment, an oscillating refractive element may be disposed within an optical system to create a temporally variable phase shift in the lights rays emanating from a coherent light source to eliminate static interference patterns on a light receiving element, reducing the speckle phenomenon. This solution involves a complex and expensive component, the oscillating refractive element. Moreover, the integration of such device requires a specific design of the projection system.

JP2001296503 describes a device for reducing speckle, which can decrease the speckle pattern appearing on the illumination face to produce uniform illumination. The laser light with linearly polarized light having the polarization plane rotated by 45 degrees is made incident on a first polarization beam splitter to be separated into the P polarized light component and S polarized light component. The P polarized light component is transmitted while the S polarized light component is reflected to equally separate the both polarized light components. The P polarized light component directly propagates while the S polarized light component is reflected by a return prism to produce an optical path difference longer than the coherence length from the optical path length of the P polarized light. Thus, incoherent laser light having two kinds of polarized light components with the optical path difference longer than the coherence length is obtained as the output from the second polarization beam splitter. This arrangement involves a complex and expensive optical system.

US2009046361 describes a reflection type screen capable of suppressing effect of external light and obtaining a wide angle of view and a forward projection system having a reflection type screen. The reflection type screen includes a transparent prism arranged in parallel to the longitudinal direction of a base. The transparent prism has a transparent plane and a diffusion-reflection plane formed by arranging a reflection film on one of the surfaces of the transparent prism. Projected light is diffused/reflected by the diffusion-reflection plane. The diffusion-reflection plane may be vibrated in order to decrease speckle noise by laser light beams. For example, by vibrating the reflection type screen in up and down, right and left, or back and fourth direction, the diffusion-reflection plane may be vibrated. Otherwise, by varying the interval W between the base and the front sheet by an air pump, the diffusion-reflection plane may also be vibrated. This arrangement involves a particular construction with a forward projection system having a complex screen configuration.

Thus, there is a need for a novel micro-projection system with reduced speckle having MEMS micro-mirrors and MEMS components in general, that do not present the above mentioned drawbacks, namely the complexity and costs problems caused by using specific configurations with additional components used only for speckle reduction.

SUMMARY OF THE INVENTION

A general aim of the invention is therefore to provide an improved method and device for reducing or suppressing speckle in a laser micro-projection system.

A further aim of the invention is to provide such method and device for reducing or suppressing speckle, which offers more possibilities for integration with pre-existing laser micro-projection systems without requiring important modifications.

Still another aim of the invention is to provide such method and device for reducing or suppressing speckle, providing efficient performances at reasonable cost.

Yet another aim of the invention is to provide such method and device for reducing or suppressing speckle, using components that can be fully integrated into a laser micro-projection device.

These aims are achieved thanks to the method for reducing speckle and the micro-projection system defined in the claims.

There is accordingly provided a micro-projection system for projecting light on a projection surface, comprising:
at least one coherent light source; optical elements in the optical path between said coherent light source and said projection surface; said optical elements including at least one reflective member actuated by a drive signal for deviating light from said light source so as to scan a projected image onto said projecting surface; said optical elements including at least one vibrating element actuated by a vibrating signal so as to reduce speckle onto said projecting surface.

An optical element, provided in the optical path between the laser and the projection surface, vibrates to avoid having all interferences at the same place. Vibration level is substantially low (preferably lower than 100 Hz) and with limited amplitude, thereby avoiding any sharpness reduction on the projected image.

The coherent light source is preferably a laser light source.

In a preferred embodiment, the vibrating element is one of said reflective members. The reflective member is advantageously a MEMS scanning mirror.

In a further variant, MEMS mirror may be actuated with defined frequency related to multiple eigen values of the mechanical motion resonant modes.

The reflection may be provided onto one 2D mirror or two 1D mirrors.

The micro-projection system advantageously comprises a plurality of light sources and a beam combiner for combining the light beams from the plurality of sources, the reflective member being placed to deviate the output beam from the beam combiner. The beam combiner enables color projection, using multiple laser sources.

In a variant, the vibrating element is an additional optical element provided in the optical path. The vibrating element may be a mirror. The mirror is advantageously provided with diffuse elements (such as nano-particles, or carbon nano-tubes, etc) to further minimize speckle. In a further variant, the micro-vibration generator comprises a rotating micro-motor having a substantially rough surface.

An another variant, the vibrating element is a reflective membrane. In a still further variant, the vibrating element is a light source.

The vibrating element is advantageously actuated by a micro-vibration generator. In an advantageous embodiment, the micro-vibration generator provides a signal superposed to the reflective member drive signal. In a further embodiment, the vibrating element comprises a magnetic, thermal, piezo-electric, or electrostatic generation unit.

The invention also provides a method for reducing speckle in a micro-projection system adapted for projecting light on a projection surface, comprising:
providing a light with at least one coherent light source;
directing light from the light source to the projection surface;
actuating at least one reflective member with a drive signal for deviating light from said light source so as to scan a projected image onto said projecting surface;
actuating at least one vibrating element with a vibration signal so as to reduce speckle onto said projecting surface.

The method provides an anti-speckle effect for an observer eye or a sensor receiving the generated illumination.

The method advantageously combines coherence length reduction by substantially dephasing and diffusing the light in order to homogenize light intensity.

The signal may be a random signal or a noise. In a variant, the signal is superposed to the reflective member drive signal.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

For clarity, as is generally the case in representation of micro-systems, the various figures are not drawn to scale.

Figure 1A:
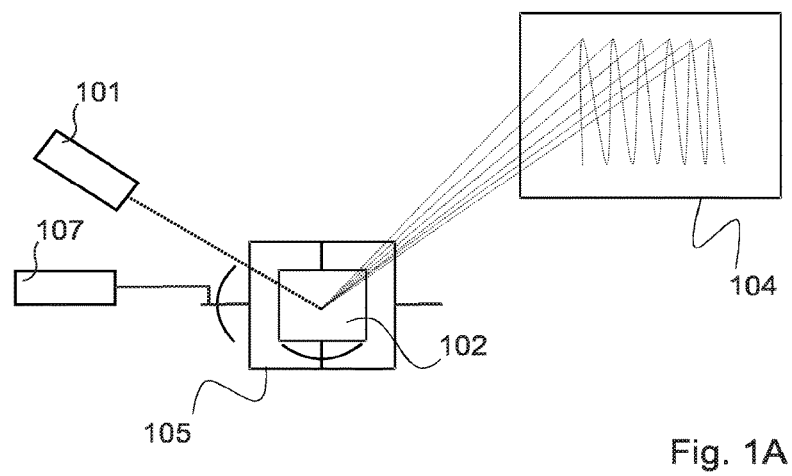
FIGS. 1A and 1B illustrate examples of MEMS micro-mirror-based projectors using respectively a single mirror moving along two perpendicular axes, or two Degrees Of Freedom (2 DOF), and a projector using two MEMS micro-mirrors moving along one axis (1 DOF)
Figure 1B:
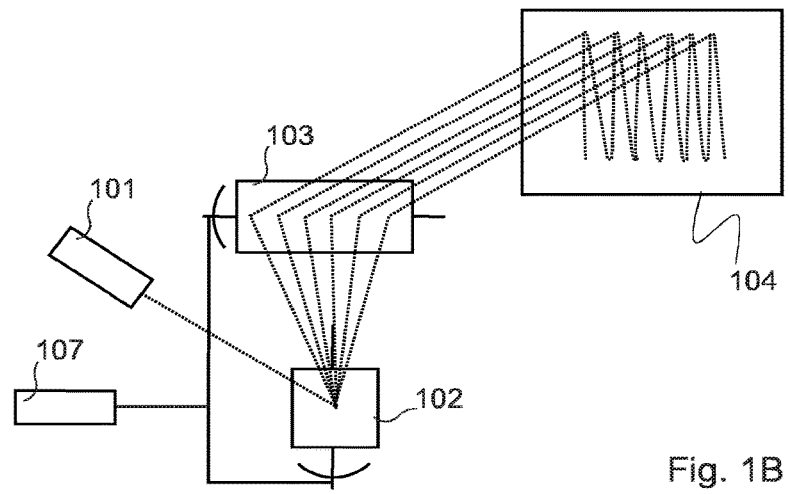

Micro-Electro-Mechanical-Systems (MEMS) in the form of scanning or moving micro-mirrors are currently being used for projection purposes. The projection can either be done using a single mirror moving along two central and perpendicular axis (two degrees of freedom 2 DOF) as shown in FIG. 1A, or two mirrors moving along a central axis (one degree of freedom 1 DOF) both placed at 90 degrees one to each other as shown in FIG. 1B. In FIG. 1A, the image is created by centering a collimated laser beam produced by laser 101 in the middle of the 2 DOF micro-mirror surface 102 within the frame 105. The laser beam is reflected and deviated in two directions, so as to project a scanned image on the projection surface 104.

In FIG. 1B, the projected image is created by centering a collimated laser beam on the first 1 DOF micro-mirror surface 102. The laser is reflected to a second 1 DOF micro-mirror surface 103 with the rotation axis placed at 90 degrees compared to the first 1 DOF micro-mirror. During the actuation of the mirror(s), the collimated laser beam can be pulsed at a specific frequency to create an image with bright, dark and grayscale parts. A monochromatic image is projected when a monochromatic laser source is used. A multi color image can be projected when multiple different monochromatic laser sources are used simultaneously. In the latter case, a known type beam combiner is preferably used.

A drive signal is used to operate the scanning mirrors 102, 103 in an optimized way. This drive signal is provided by the scanning mirror drive unit 107.

Figure 2:
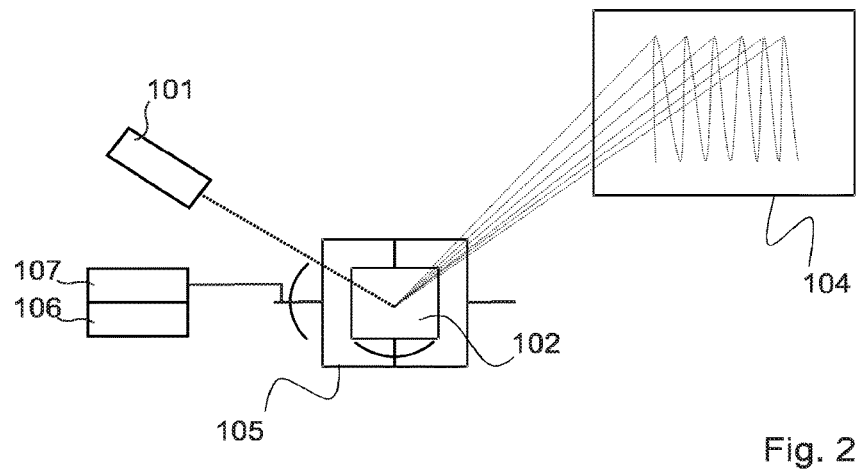
FIG. 2 illustrates an example of a micro-projection system with a scanning mirror drive unit and micro-vibration generator providing together a driving signal with a superposed micro-vibration signal.

FIG. 2 illustrates an embodiment in which the micro-projection system is provided with a scanning mirror drive unit 107 and micro-vibration generator 106 providing together a driving signal with a superposed micro-vibration signal. In this first embodiment of the invention, the micro-mirror 102 is used as an anti-speckle mirror. The single 2 DOF micro-mirror is connected to a micro-vibration generator 106, providing a signal superposed to the reflective member drive signal.

The anti-speckle vibration is thus generated by this additional noise or random signal added to the vertical or to the horizontal, or to both drive signals, thus producing a slightly non-linear deflection of the reflecting mirrors, and a position of each projected pixel or line slightly different from the expected position and of the position of corresponding pixels or lines in previous frames.

Figure 3:
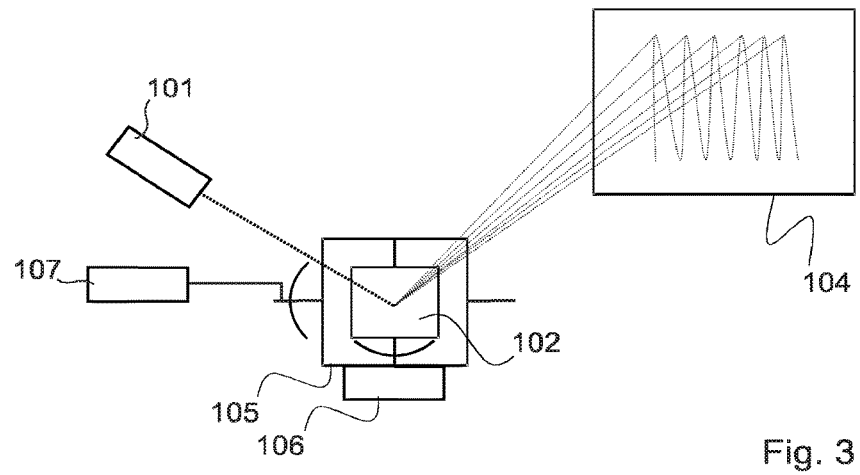
FIG. 3 illustrates another example of a micro-projection system with a micro-vibration generator acting directly on a scanning mirror.

FIG. 3 illustrates an embodiment of a micro-projection system in which a micro-vibration generator 106 acts by direct contact with a scanning mirror 102. In this embodiment, the micro-vibration generator 106 comprises either a magnetic, or thermal, or piezo-electric, or electrostatic generation unit to provide the required micro-vibration. The generator is preferably placed in direct contact with the scanning mirror to allow the produced micro-vibrations to be transmitted to the micro-mirror.

Figure 4:
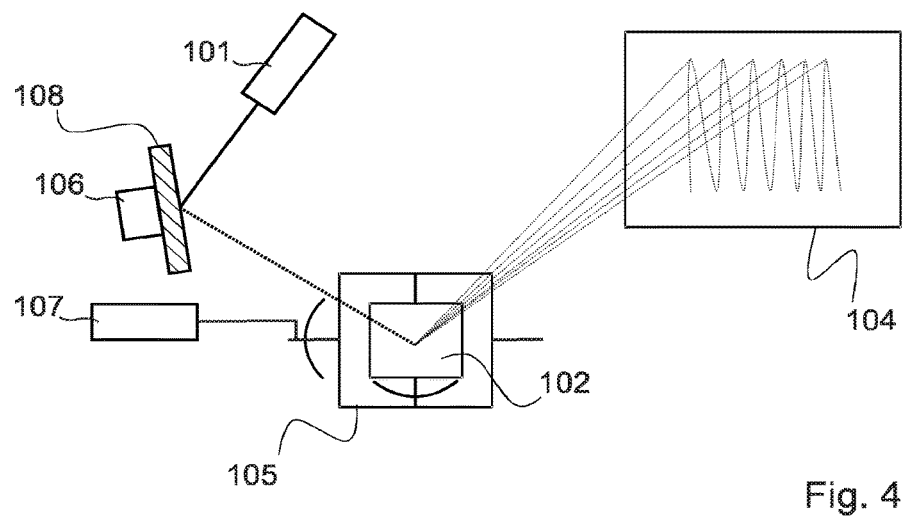
FIG. 4 illustrates a further example of a micro-projection system provided with an additional mirror or membrane connected to a micro-vibration generator.

FIG. 4 illustrates a variant of the previous a micro-projection system provided with an additional mirror or membrane 108 connected to a micro-vibration generator 106. As previously described for the embodiment of FIG. 3, the micro-vibration generator 106 comprises either a magnetic, or thermal, or piezo-electric, or electrostatic generation unit to provide the required micro-vibration. In a variant, the generator 106 may comprise a rotating micro-motor having a substantially rough surface, thereby providing the required micro-vibration. In another variant, diffuse elements such as nano particles, carbon nanotubes, etc may also be provided on the mirror to further minimize speckle.

Figure 5:
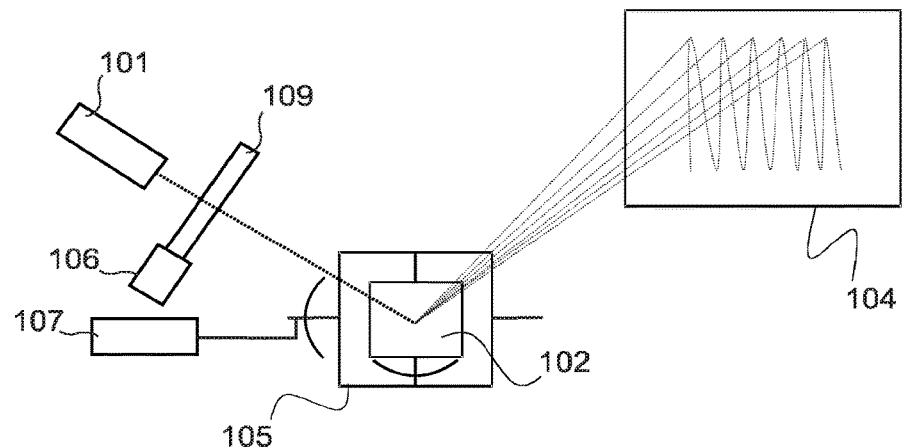
FIG. 5 illustrates a still further example of a micro-projection system provided with an additional transparent optical element, connected to a micro-vibration generator.

FIG. 5 illustrates a still further example of a micro-projection system provided with an additional semi-transparent optical element 109, connected to a micro-vibration generator 106. The generator is preferably placed in direct contact with the scanning mirror to allow the produced micro-vibrations to be transmitted to the optical element. As previously described for the embodiment of FIG. 3, a magnetic, or thermal, or piezo-electric, or electrostatic generation unit to provide the required micro-vibration.

Figure 6:
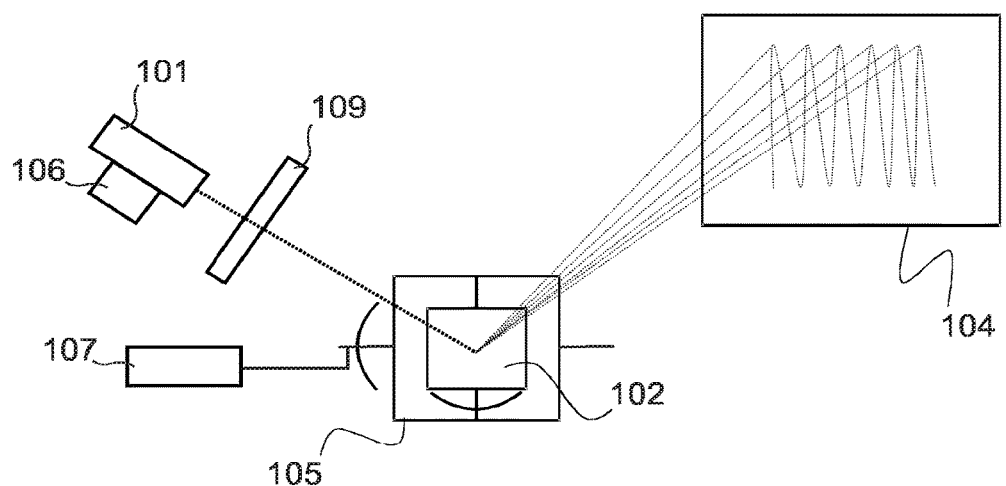
FIG. 6 illustrates yet another example of a micro-projection system in which the light source or sources is/are provided with micro-vibration generator.

FIG. 6 illustrates yet another example of a micro-projection system in which the light source or sources is/are provided with micro-vibration generator 106 also provided with a magnetic, or thermal, or piezo-electric, or electrostatic generation unit to provide the required micro-vibration.

All previous embodiments may also be implemented in a micro-projection system comprising two 1 DOF micro-mirrors (as shown in FIG. 1B).

In all described embodiments, the micro-vibration generator 106 generates movement of the reflective member between 10 to 1 mm, preferably between 50 to 500 nm and more preferably between 100 to 300 nm. For an observer eye placed in a way to look at the projection image, the processed light provides an anti-speckle effect such that perceived speckle is reduced or suppressed. A similar effect is also provided for a sensor placed to receive the generated illumination.

Monochromatic scanning and projection can be achieved with the previous described architectures using a single laser source. For color projection with multiple laser sources, similar assembly concepts can be applied by specifically shaping a known beam combiner optical module. The beam combiner may be composed of multiple optical components with specific coatings allowing to reflect certain wavelength and to transmit certain other wavelengths. An example of architecture for color projection is using three light sources, typically red, green and blue to achieve the visible spectrum range. However this architecture is not limited to three light sources and to the visible spectrum, but can be expanded to multiple light sources and to the other part of the spectrum, which can help to achieve a wider spectral range.

The shape of the MEMS scanning micro-mirror is not limited to the geometry presented in the Figures but can also have a circular or an elliptical shape. The described architectures can be either applied for fully or partially encapsulated MEMS scanning micro-mirror based on electrostatic, electromagnetic, thermal and piezoelectric actuation principles.

Figure 7:
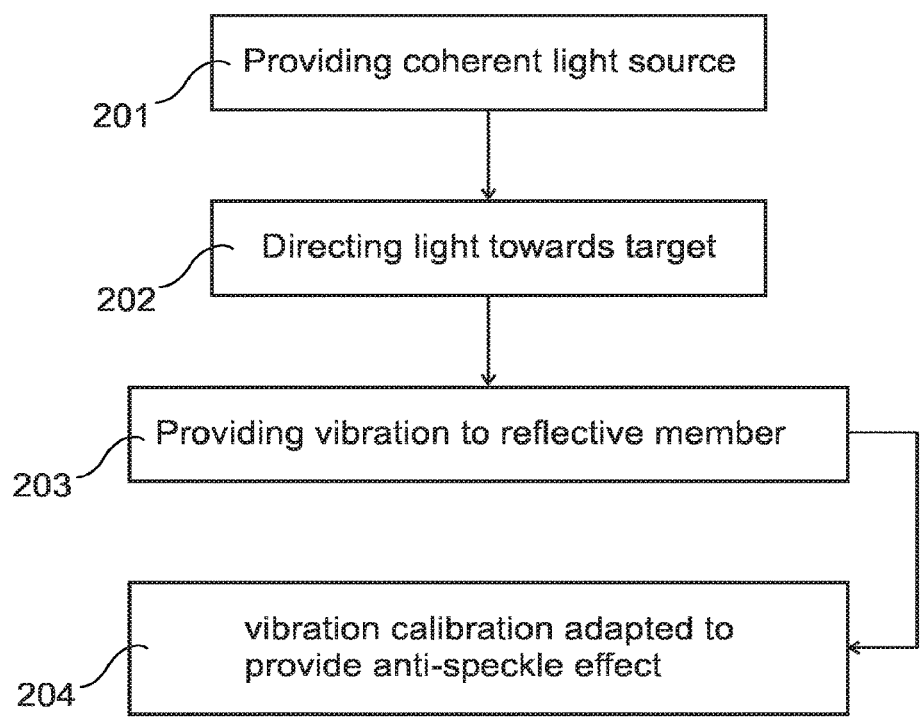
FIG. 7 illustrates the main steps of the method for reducing speckle in a micro-projection device.

FIG. 7 illustrates the main step of the method for reducing speckle in a laser micro-projection system. At step 201, one or more coherent light sources, such as laser light sources are used to emit light. At step 202, optical elements such as reflective members (for instance mirrors or reflective membranes), a beam splitter, a wave plate, etc, are used for directing light from the light source to a target such as a screen. At step 203, micro-vibrations are provided to at least one reflective member. Such vibrations may be generated according to two different approaches. First, a micro-vibration generator 106 is coupled to the scanning mirror drive unit 107, which sends a drive signal to the scanning mirror 102 with superposed micro-vibration signal. In a second approach, the micro-vibration generator 106 is mechanically connected to an optical element, such as a scanning-mirror, as shown in FIG. 3, to an anti-speckle mirror or membrane 108, as shown in FIG. 4, to an anti-speckle optical element 109, as shown in FIG. 5, or to the light source 101, as shown in FIG. 6. The micro-vibrations are generated in order to provide micro-motion to the corresponding optical element, thereby resulting in an anti-speckle effect (step 204).

The process combines coherence length reduction by substantially dephasing and diffusing the light in order to homogenize light intensity. The vibrating signal applied to a vibrating generator may be a random signal or a noise, i.e., a signal uncorrelated and not synchronized with the image signal or with the drive signal.

What is claimed is:

1. An apparatus comprising:
a plurality of optical elements, the plurality of optical elements comprising:
a reflective element to receive a light beam and to reflect the light beam towards a display surface, the reflective element to oscillate about one or more oscillation axes, based at least in part on a drive signal, to scan the light beam to project an image onto the display surface; and
a vibrating element to introduce noise into the oscillation of the reflective element based at least in part on a vibrating signal, the vibrating signal substantially uncorrelated with the drive signal.

2. The apparatus of claim 1, the reflective element to receive a drive signal and to oscillate about the one or more oscillation axes based at least in part on the drive signal.

3. The apparatus of claim 2, the vibrating element to introduce noise into the drive signal.

4. The apparatus of claim 3, the vibrating element to generate a speckle reduction signal and to superpose the speckle reduction signal onto the drive signal.

5. The apparatus of claim 1, wherein the reflective element is a MEMS scanning mirror.

6. The apparatus of claim 1, wherein the vibrating element is an optical element.

7. The apparatus of claim 1, wherein the vibrating element is a mirror.

8. The apparatus of claim 7, wherein the mirror comprises one or more diffuse elements.

9. The apparatus of claim 1, wherein the vibrating element comprises a magnetic, thermal, piezo-electric, or electrostatic generation unit.

10. The apparatus of claim 1, wherein the vibrating element comprises a rotating micro-motor having a substantially rough surface.

11. A projection system comprising:
a plurality of optical elements, the plurality of optical elements comprising:
one or more reflective elements to receive a light beam and to reflect the light beam towards a display surface, the one or more reflective elements to oscillate about an oscillation axes, based at least in part on a drive signal, to scan the light beam to project an image onto a projection surface; and
a vibrating element to introduce noise into the oscillation of the one or more reflective elements based at least in part on a vibrating signal, the vibrating signal substantially uncorrelated with the drive signal.

12. The system of claim 11, the one or more reflective elements a single 2 Degree of Freedom (2DOF) micro-mirror, the 2DOF micro-mirror to deflect in both a horizontal and vertical direction to oscillate about two or more oscillation axes.

13. The system of claim 12, the vibrating element to introduce noise into the deflection of the reflective element in at least one of the horizontal direction or the vertical direction.

14. The system of claim 11, the one or more reflective elements a first 1 Degree of Freedom (DOF) micro-mirror and a second 1DOF micro-mirror, the first 1DOF micro-mirror to deflect in a horizontal direction and the second 1DOF micro-mirror to deflect in a vertical direction.

15. The system of claim 11, the vibrating element to introduce noise into the deflection of at least one of the first 1DOF micro-mirror or the second 1DOF micro-mirror.

16. The system of claim 11, the one or more reflective elements to receive a drive signal and to oscillate about the one or more oscillation axes based on the drive signal.

17. The system of claim 11, the vibrating element to generate a speckle reduction signal and to superpose the speckle reduction signal onto the drive signal.

* * * * *